UNITED STATES PATENT OFFICE.

ANTOINE MURTINEDDU, OF MARSEILLES, FRANCE.

IMPROVED BLASTING-POWDER.

Specification forming part of Letters Patent No. 17,291, dated May 12, 1857.

*To all whom it may concern:*

Be it known that I, ANTOINE MURTINEDDU, of Marseilles, in the French Empire, have invented a new and useful Improvement in Inexplosive Mining-Powder; and I hereby declare that the following is a full, clear, and exact description thereof.

The nature of my invention consists in a new composition of matter which, when ignited, will not explode, but will give out such a great amount of heat that it will blast rocks with great ease and without danger.

The usefulness of my composition is apparent when it is employed in cities, where rocks may be blasted for excavation, mines, or other purposes without injuring the surrounding structures, however frail they may be. This preparation derives its power of action from the excessive heat which is evolved within a very limited space of time while burning. This action is the more effective the harder the stone or rocks are. The effect produced is manifested to the exterior by a crushing or cracking noise, and by a very slight rising or sliding motion of the separated rock or block. This composition is a yellowish and dry powder, enters in ebullition and liquefies, depositing a hard and black mass which has the appearance of calcined bituminous coal.

The powder is composed of the following substances, in the proportions, respectively, as follows: sulphur, one hundred kilograms, say two hundred pounds; saltpeter, one hundred kilograms, say two hundred pounds; sawdust, fifty kilograms, say one hundred pounds; horse-dung, fifty kilograms, say one hundred pounds; salt, (Cl Na,) ten kilograms, say twenty pounds. I melt the saltpeter and the salt with a sufficient quantity of water at a brisk heat. I add four kilograms of molasses (eight pounds) for every one hundred kilograms (two hundred pounds) of saltpeter, and ten kilograms (twenty pounds) of salt. The fusion being accomplished, I throw the whole upon the mass of the compound previously prepared and mixed in the proportions as above set forth. This mixture is thoroughly amalgamated and exposed to a gentle heat for the purpose of drying. The addition of molasses causes an increase of cohesion between the different parts of the mixture, which may thus be manufactured either in cakes of any size or in powder more or less fine. The powder is generally used in vertical mines, or in mines inclined at an angle with the horizon. In horizontal mines the powder cannot be used except when contained in cartridges; but then these cartridges do not fill the mine with the required precision. Cakes are therefore manufactured, and answer the purpose admirably for charging horizontal mines with precision and facility.

Having now fully described my improvement, what I claim as my invention, and desire to secure by Letters Patent, is—

The composition of matter herein specified.

In testimony whereof I have signed my name to this specification before two subscribing witnesses.

MURTINEDDU.

Witnesses:
   E. SINGINS,
   LOUIS SAUTEL.